Patented Sept. 1, 1953

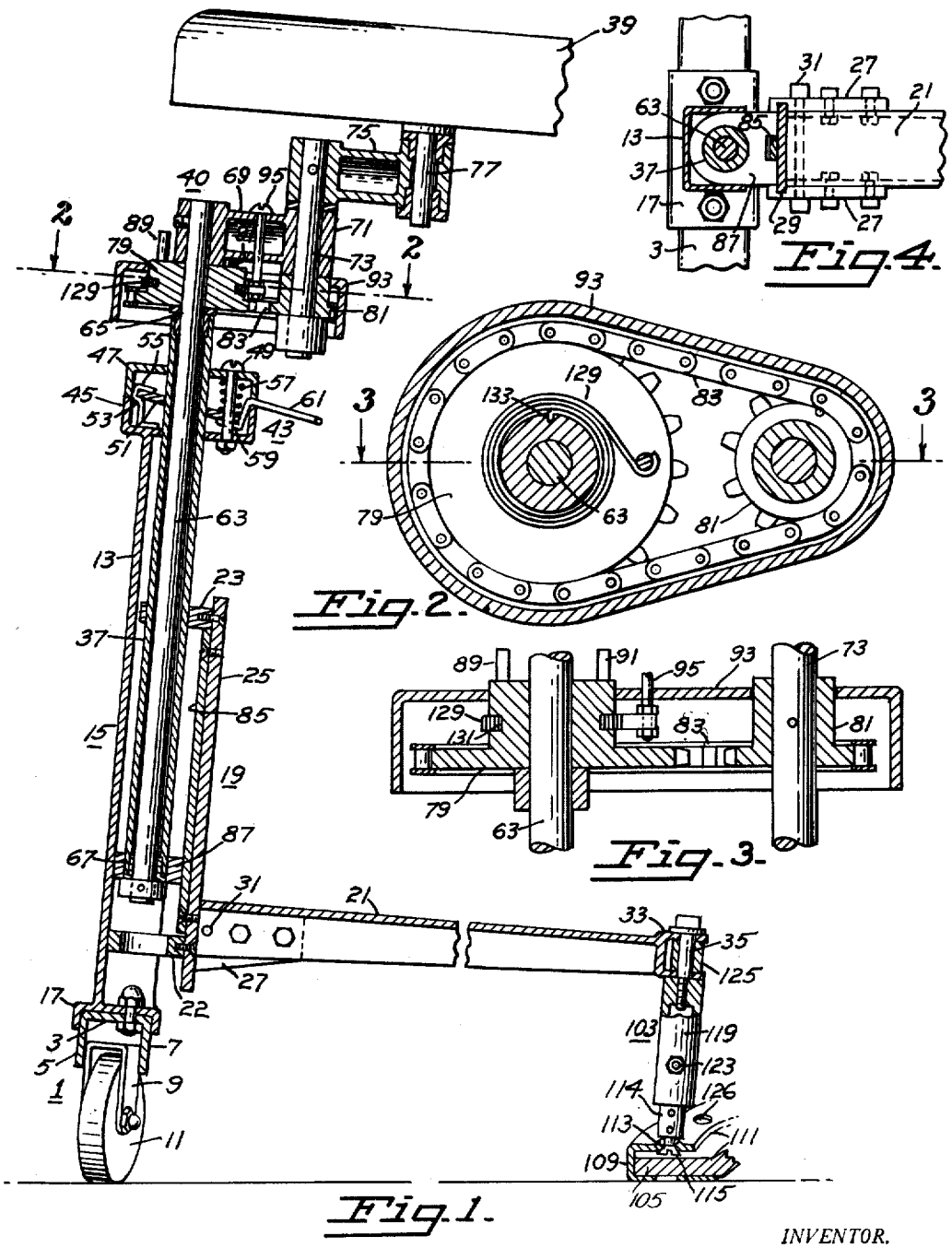

2,650,647

UNITED STATES PATENT OFFICE 2,650,647

ADJUSTABLE SEAT ASSEMBLY

Edgar W. MacKnight, San Leandro, Calif.

Application September 5, 1950, Serial No. 183,245

6 Claims. (Cl. 155—81)

1

My invention relates to adjustable seats and more particularly to a seat assembly for technicians such as dentists, to permit such technicians to operate while comfortably seated, and constitutes an improvement upon the adjustable seat assembly forming the subject of my prior application for an Adjustable Seat Assembly, Serial No. 87,277, filed April 13, 1949, now Patent No. 2,572,874 of October 30, 1951.

Among the objects of my invention are:

(1) To provide a novel and improved adjustable seat assembly, particularly for use by dentists or the like when working on patients;

(2) To provide a novel and improved adjustable seat assembly for dentists or the like, which will facilitate the approach and retreat of an operator with respect to a patient in a patient's chair;

(3) To provide a novel and improved seat assembly for dentists, which will permit such dentist or the like to move with greater ease and comfort to any desired position with respect to a patient;

(4) To provide a novel and improved seat assembly for dentists or the like, which will permit movement by the operator to any desired position with respect to a patient, and afford such operator a stronger feeling of security while operating on such patient.

Additional objects of my invention will be brought out in the following description of a preferred embodiment of the same taken in conjunction with the accompanying drawings wherein—

Figure 1 is a view in section of a seat assembly embodying the features of the present invention and illustrating the manner of tying the same in with a patient's chair;

Figure 2 is a view in section, taken in the plane 2—2 of Figure 1;

Figure 3 is a view in section, taken in the plane 3—3 of Figure 2; and

Figure 4 is a view depicting a structural detail of the assembly of Figure 1.

The invention, as illustrated in the drawings, includes a wheel truck 1 involving a trough member 3 having depending side walls 5 and 7, and between these side walls, adjacent each end of the trough member, there is welded or otherwise affixed a depending yoke 9 for mounting a wheel 11.

A vertically disposed channel member 13, constituting the outer component of an adjustable telescopic standard 15, has at its lower end, a cross arm in the form of a shallow saddle 17 which straddles the trough member of the wheel truck and is bolted thereto, thereby providing firm anchorage for the vertical channel member.

This vertical channel supports a bracket 19 on which a tongue 21 may be slidably adjusted as to elevation, such bracket constituting a pair of spaced bracket blocks 22 and 23 inserted within the channel member and welded or otherwise affixed thereto, and to the exposed ends of these two blocks, there is bolted a bracket plate 25 of a width such that its vertical edges extend slightly beyond the bracket blocks to either side thereof.

The aforementioned tongue 21 involves a length of channel member, preferably slightly tapered for appearance sake, with its broad end toward the bracket plate to which it is adjustably fixed for elevational adjustments. This is accomplished by affixing to each side of the tongue at its broad end, a clamping plate 27 which overhangs or extends beyond the end of the tongue sufficiently to permit of the formation of a groove 29 adapted to receive an edge of the bracket plate. A clamping bolt 31 passing through the tongue and clamping plates constitutes means for drawing the clamping plates toward each other for clamping the tongue to the bracket plate at any desired position along such bracket plate.

Such vertical adjustment of the tongue permits the seat assembly to be accommodated to chairs of different designs and styles, as placed on the market by different manufacturers, thus enabling the tongue to clear operating pedals, engine rheostat, etc., as well as the base flange of the patient's chair, which allows the operator to move in close to the patient.

At its narrow end, the tongue terminates in a pivot yoke 33 having its legs lying in parallel horizontal planes, and perforated to receive a vertically disposed clamping bolt 35.

The inner member of the telescopic standard constitutes a tube 37 which carries the seat 39 and associated mechanism 40. It is telescopically supported within the vertical channel member by providing aligned openings in the bracket blocks 22, 23 of a size sufficiently to slidably receive the tube, and at the upper end of the vertical channel member, there is provided means 43 for locking such tube in any vertically adjusted position.

Such means comprises a rectangular housing of two sections, namely, a lower section 45 which is integrally united to the upper end of the vertical channel member, and an upper section 47 which provides a matching fit with the lower section. The upper section is held to the lower section by a bolt 49, both sections having vertically aligned openings to permit passage of the tube 37.

Within the housing is a locking plate 51 which has a central beveled opening therethrough, through which the tube may comfortably pass when such locking plate is in a horizontal position. At one end, this locking plate is loosely supported between a shoulder 53 and a flange 55 formed by suitably crimping a piece of sheet metal and welding the same into the lower section of the housing, while at its opposite end, the plate is provided with a perforation through which the bolt 49 passes, the plate being normally urged downwardly at this end, against the tube 37 by a compression spring 57 thereabove. Disposed below the locking plate in line with the compression spring 57, is a lip 59 constituting one end of a lever 61, preferably in the form of a stiff wire loop which extends through a wall of the housing and fulcrums on the edge of the opening through which it passes. Under the action of the compression spring, the tube will, in the absence of any opposing force, remain in its prevailing adjustment, and any weight or pressure applied to the upper end of the tube, as when one sits upon the seat, will only serve to enhance the binding effect of the locking plate thereon.

When it is desired to adjust or change the elevational position of the seat which is carried on the tube, a downward pressure on the exposed end of the lever, will lift the lower end of the locking plate, thereby bringing the plate to a horizontal plane, whereby the tube will be freed for movement along its vertical axis.

As previously indicated, the tube 37 carries the seat 39 and its associated mechanism 40. Such associated mechanism includes a rod or shaft 63 journaled in bearings 65, 67 disposed, one at each end of the tube. This shaft extends beyond the upper end of the tube and at this end, there is fixedly mounted an arm 69 which terminates at its other end in a bearing 71, in which is journaled a short shaft 73 which protrudes from the bearing at either end thereof. At its upper end, this short shaft has affixed thereto a seat arm 75 in the free end of which is journaled the stem 77 of a suitable seat 39, spaced bearings being preferably provided for this purpose.

As thus far described, the path of movement of the seat with respect to the axis of the supporting tube, is indeterminable and not fixed. This is so because, under the circumstances, the seat is adapted to swing indiscriminately about the short shaft as an axis, while at the same time, the short shaft is adapted to swing indiscriminately about the axis of the supporting tube. Therefore, in order to pre-establish the permissible path of movement of the seat with respect to the axis of the supporting tube, both of the aforementioned swinging movements must be controlled with respect to each other.

This I accomplish by fixedly mounting on the upper end of the tube, a sun gear 79, while at the lower end of the short shaft 73, I provide a planetary gear 81, and then connect the two gears by some drive means such as a chain drive 83. With such a connection, any swinging movement on the part of the short shaft in an arc about the axis of the supporting tube, will cause the seat to swing in an arc in opposite direction about the short shaft axis.

By selecting a proper relationship between the ratio of arm lengths and the gear ratio, substantially linear movement of the seat may be realized and along a path through the axis of the supporting tube. A gear ratio of two to one between the sun gear and planetary gear will satisfy the requirements, where both arms are of the same length.

To assure that such linear movement shall be confined to a particular direction, namely, along the axis of the tongue, which will then provide for linear movement toward and away from a patient, the seat and its associated mechanism should be initially assembled so that a line joining the axis of the supporting tube and the center of the seat, shall sight along the axis of the tongue, and to assure maintenance of such directional adjustment, the sun gear must be fixed against rotation on its axis. This is accomplished by affixing a guide rib 85 along the back of the bracket plate 25 and slidably engaging the same by a guide block 87 affixed to the tube 37.

Extending upwardly from the sun gear, are a pair of stop pins 89, 91 disposed on a line preferably slightly off center. Such stop pins stand in the path of movement of the planetary arm 69 and thus preclude the short shaft from ever reaching a dead center position, which might interfere with smooth, effortless movement of the seat. Ease of movement of the seat between its forward and retracted positions will, therefore, always be assured.

A shroud 93 may be installed over the planetary gear arrangement and, when so installed, is held out of contact with the chain drive by a bolt 95 extending through the planetary arm.

The entire seat assembly is designed for arcuate travel about the bolt axis located at the end of the tongue, and accordingly, to facilitate such movement, the truck wheel yokes 9 are installed on a slight angle so as to cause the wheels to describe an arc about such pivot point without drag.

Means for fastening the seat assembly to a dental chair preferably takes the form of a pivot post 103, provision being made for anchoring the same to the lower rim 105 of the base of the patient's chair by means of a suitable clamp. Such clamp may involve an arcuate trough section 109 adapted to fit over the rim of the chair base, leaving an exposed upper horizontal flange 111 to which may be attached one end of the pivot post.

Such attachment is preferably by way of a ball and socket connection, the rim being raised at the point of connection to provide a socket 113, while the pivot post, at its point of connection, having a tubular lower end 114 which is threaded internally for the reception of a bolt 115 passing through the flange of the clamp, with its head fitting into the socket. By constricting the neck of the bolt, a certain latitude of movement for the pivot post will be permitted at this point.

By providing a lateral perforation through the lower end of the pivot post to expose certain of the threads on the bolt, and then deforming such threads with a suitable tool, the pivot post connection to the clamp may be made permanent.

The pivot post is preferably made extensible by making it of telescoping parts, namely a pivoted tubular element 114 with a sleeve 119 slidable thereon, and then providing means for supporting the sleeve at different elevational positions on the tubular element. This can be readily accomplished by laterally perforating the pivoted element at spaced points longitudinally, and providing a pair of diametrically disposed openings in the sleeve, which are adapted to line up with selected perforations in the pivoted element. The perforations in the sleeve are preferably of larger diameter than the openings in the pivoted element to receive the head and nut of a clamping bolt 123 passing through the aligned holes, whereby, upon tightening the nut on such bolt, the tightening pressure will be applied solely to the pivoted element, and sufficiently to compress the same and cause corresponding expansion in a normal direction against the sleeve, to thereby bind the same against movement with respect to the pivoted element.

At its upper end, the sleeve is closed except for a threaded axial opening for the reception of the pin or bolt 35. Such bolt is adapted to pass through the perforations in the yoke at the end of the tongue prior to threading the bolt into the upper end of the sleeve for securing the seat assembly to the pivot post. A suitable spacing collar 125 may be applied to the bolt for disposition between the spaced arms of the pivot yoke, to rigidify the connection at this point, so that all pivot movement will occur at the lower end of the pivot post.

The ball and socket pivot connection of the pivot post to the clamp not only provides for the arcuate travel of the entire seat assembly as indicated, but permits the seat assembly to ride over obstructions or irregularities without transmitting undue strain to any part of the device.

Ordinarily, in the average installation, the weight of the patient's chair on the lower flange of the clamp will be sufficient to hold the pivot post installation in place, but in the event such chair should be susceptible to creeping, the upper flange of the clamp may be provided with one or more threaded openings 126 for the reception of clamping screws which may be tightened down against the rim of the base of the chair.

In accordance with the improved features of the present invention, I provide means for normally restraining movement of the seat from its retracted position, in the absence of an overpowering force, and such means preferably takes the form of a flat coil spring 129 encircling the sun gear and having one end anchored in said gear and its other end hooked around the lower end of the bolt 95, which is the same as being anchored to the planetary arm 69. The spring is preferably disposed in a circumferential groove 131 formed in the gear, by anchoring one end of a length of spring wire in a recess 133 in a wall of such groove, wrapping such wire around the gear and then hooking its free end about the bolt 95.

Any force sufficient to overcome the resistance offered by the spring, will cause the seat to move forward, the spring in the meantime being tighter to build up a sufficient restoring force, so that upon removal of said overcoming force, the seat will be restored to its retracted position. Under these conditions, the entire seat assembly may now be adjusted to a slight tilt angle with the vertical, say of the order of 2 to 5 degrees, without the seat shifting from its retracted position. One of the advantages derived from this relationship resides in the fact that the weight of the operator on the seat will provide a component of force in the forward direction of its movement, thus facilitating the use of the seat assembly in carrying the operator toward the patient.

Working from a seat so tilted, places the operator in a more comfortable and relaxed posture, at the same time avoiding the necessity of consciously holding the seat against retraction by the spring, thus enabling the operator to work more effectively and efficiently.

From the above description of my invention in its preferred form, it will become apparent that the same fulfills all the objects of my invention as previously stated, and while I have described my invention in considerable detail, the same is subject to alteration and modification without departing from the underlying principles thereof, and I, therefore, do not desire to be limited in my protection to such details, except as may be necessitated by the appended claims.

I claim:

1. An adjustable seat assembly comprising a wheel truck; a standard extending upwardly from said wheel truck; a seat; means supporting said seat on said standard for movement laterally thereof; means for holding said standard at a slight tilt angle with the vertical; and means normally restraining movement of said seat in the direction of such tilt angle from a normal unoccupied position in the absence of an overpowering force applied to said seat and adapted to restore said seat to its normal unoccupied position upon release of such force.

2. An adjustable seat assembly comprising a wheel truck, a standard extending upwardly from said wheel truck; a seat; means supporting said seat on said standard for movement laterally thereof; means for holding said standard at a slight tilt angle with the vertical; and spring means normally restraining movement of said seat in the direction of such tilt angle from a normal unoccupied position in the absence of an overpowering force applied to said seat and adapted to restore said seat to its normal unoccupied position upon release of such force.

3. An adjustable seat assembly comprising a wheel truck; a standard extending upwardly from said wheel truck; a seat; means supporting said seat on said standard, said seat supporting means including a pair of arms, means connecting said arms for angular movement, one with respect to the other, means pivotally mounting said arms at the free end of one of them to said standard, and means at the free end of the other of said arms for carrying said seat; means for holding said standard at a slight tilt angle with the vertical; and means normally restraining movement of said seat in the direction of such tilt angle from a normal unoccupied position in the absence of an overpowering force applied to said seat and adapted to restore said seat to its normal unoccupied position upon release of such force.

4. An adjustable seat assembly comprising a wheel truck; a standard extending upwardly from said wheel truck; a seat; means supporting said seat on said standard for movement laterally thereof, said seat supporting means including a pair of arms, means connecting said arms for angular movement, one with respect to the other, means pivotally mounting said arms at the free end of one of them to said standard, and means at the free end of the other of said arms for carrying said seat; means for holding said standard at a slight tilt angle with the vertical; and means normally restraining movement of said seat in the direction of such tilt angle from a normal unoccupied position in the absence of an overpowering force applied to said seat and adapted to restore said seat to its normal unoccupied position upon release of such force, said means including a coil spring, one end of which is in effect anchored to said standard and the other end to that arm which is pivotally connected to said standard.

5. An adjustable seat assembly comprising a wheel truck; a standard extending upwardly from said wheel truck; a seat; means supporting said seat on said standard for movement laterally thereof, said seat supporting means including a sun gear fixedly mounted at the upper end of said standard, a planetary arm pivotally mounted at one end on the axis of said sun gear and rotatable on such axis with respect to said sun gear, a planetary gear journaled adjacent the free end of said planetary arm in substantially the plane of said sun gear, a seat supporting arm, means rigidly connecting said seat supporting arm at one end to said planetary gear axially thereof, and a drive connection between said sun gear and said planetary gear involving a chain encircling both said gears, means for holding said standard at a slight tilt angle with the vertical; and means normally restraining movement of said seat in the direction of such tilt angle from a normal unoccupied position in the absence of an overpowering force applied to said seat and adapted to restore said seat to its normal unoccupied position upon release of such force.

6. An adjustable seat assembly comprising a wheel truck; a standard extending upwardly from said wheel truck; a seat; means supporting said seat on said standard for movement laterally thereof, said seat supporting means including a sun gear fixedly mounted at the upper end of said standard, a planetary arm pivotally mounted at one end on the axis of said sun gear and rotatable on such axis with respect to said sun gear, a planetary gear journaled adjacent the free end of said planetary arm in substantially the plane of said sun gear, a seat supporting arm, means rigidly connecting said seat supporting arm at one end to said planetary gear axially thereof, and a drive connection between said sun gear and said planetary gear involving a chain encircling both said gears, means for holding said standard at a slight tilt angle with the vertical; and means normally restraining movement of said seat in the direction of such tilt angle from its normal unoccupied position in the absence of an overpowering force applied to said seat and adapted to restore said seat to its normal unoccupied position upon release of such force, said means including a coil spring, one end of which is anchored to said sun gear and the other end to said planetary arm.

EDGAR W. MacKNIGHT.

References Cited in the file of this patent
UNITED STATES PATENTS

| Number | Name | Date |
|---|---|---|
| 604,417 | Richardson | May 24, 1898 |
| 972,472 | Riebe | Oct. 11, 1910 |
| 1,147,896 | Schroeder | July 27, 1915 |
| 1,322,551 | Efaw | Nov. 25, 1919 |
| 1,712,927 | Martois | May 14, 1929 |
| 2,087,932 | Zola | July 27, 1937 |
| 2,297,845 | Templeton | Oct. 6, 1942 |
| 2,345,163 | Vollrath | Mar. 28, 1944 |
| 2,533,363 | Donohoe | Dec. 12, 1950 |
| 2,586,120 | Templeton | Feb. 19, 1952 |